US008687519B2

(12) United States Patent
Takács (10) Patent No.: US 8,687,519 B2
(45) Date of Patent: Apr. 1, 2014

(54) FORCED MEDIUM ACCESS CONTROL (MAC) LEARNING IN BRIDGED ETHERNET NETWORKS (75) Inventor: Attila Takács, San Jose, CA (US)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 1037 days.

(21) Appl. No.: 12/305,810

(22) PCT Filed: Dec. 8, 2006

(86) PCT No.: PCT/IB2006/003535
§ 371 (c)(1),
(2), (4) Date: Dec. 19, 2008

(87) PCT Pub. No.: WO2008/001159
PCT Pub. Date: Jan. 3, 2008

(65) Prior Publication Data
US 2010/0232316 A1 Sep. 16, 2010

Related U.S. Application Data (60) Provisional application No. 60/805,886, filed on Jun. 27, 2006.

(51) Int. Cl.
H04L 12/28 (2006.01)
(52) U.S. Cl.
USPC ............................ 370/254; 370/392; 370/401
(58) Field of Classification Search
None
See application file for complete search history.

(56) References Cited

U.S. PATENT DOCUMENTS

| 5,987,522 | A * | 11/1999 | Rijhsinghani | 709/240 |
| 7,325,075 | B1 * | 1/2008 | Chiu et al. | 709/245 |
| 2002/0061009 | A1 * | 5/2002 | Sorensen | 370/351 |
| 2002/0073338 | A1 * | 6/2002 | Burrows et al. | 713/201 |
| 2002/0196735 | A1 * | 12/2002 | Hayes | 370/216 |
| 2003/0026230 | A1 * | 2/2003 | Ibanez et al. | 370/338 |
| 2003/0067926 | A1 * | 4/2003 | Golikeri et al. | 370/401 |
| 2003/0202463 | A1 * | 10/2003 | de Heer et al. | 370/216 |
| 2004/0042402 | A1 * | 3/2004 | Galand et al. | 370/237 |
| 2004/0218542 | A1 * | 11/2004 | Lee | 370/248 |
| 2004/0264458 | A1 * | 12/2004 | Six | 370/389 |
| 2005/0083949 | A1 * | 4/2005 | Dobbins et al. | 370/395.53 |

(Continued)

OTHER PUBLICATIONS

Farrel, A. et al. Path Computation Element (PCE) Architecture. IETF Internet Draft PCE Working Group. draft-ietf-pce-architecture-00.txt. Mar. 2005, 22 pages.

Primary Examiner — Marsha D Banks Harold
Assistant Examiner — Hooman Houshmand (57) ABSTRACT A system, method, and Ethernet bridge utilizing forced MAC learning to set up a path from an originating node, PON (23) to one or more terminating nodes, PTN (12) through intermediate bridge nodes (14, 21). In the point-to-point case, a Previous Hop Bridge (PHB) list defines the links in the path. Each link includes a destination address, source address, port number, and VID. A path learning frame (13, 19, 22) containing the list is sent in reverse order from the PTN through the intermediate bridge nodes to the PON. Each node in the path saves the received frame's header information as learned path information using standard MAC learning functionality, removes the node's own information from the list, and forwards the frame with the remainder of the list to the next node using the port specified by the port number for that link. When the frame arrives at the PON, all nodes have saved the learned path information.

5 Claims, 3 Drawing Sheets

(56) References Cited

U.S. PATENT DOCUMENTS

| | | |
|---|---|---|
| 2005/0100026 A1* | 5/2005 | Mancour ................. 370/400 |
| 2005/0149625 A1* | 7/2005 | Rouyer et al. ............ 709/220 |
| 2006/0171311 A1* | 8/2006 | Naik et al. ............... 370/229 |
| 2006/0251065 A1* | 11/2006 | Hamamoto et al. ........ 370/389 |
| 2007/0115837 A1* | 5/2007 | Elie-Dit-Cosaque et al. 370/242 |
| 2008/0049621 A1* | 2/2008 | McGuire et al. .......... 370/236.2 |

\* cited by examiner

FORCED MEDIUM ACCESS CONTROL (MAC) LEARNING IN BRIDGED ETHERNET NETWORKS

TECHNICAL FIELD OF THE INVENTION

The present invention relates generally to communications networks, and in particular, to a method and system for forced MAC learning in bridged Ethernet networks.

DESCRIPTION OF RELATED ART

The operation of bridged Ethernet networks is based on techniques such as broadcast, spanning tree, virtual local area networks (VLANs), and MAC learning. These techniques are described in detail in IEEE 802.1D-2004 dated Jun. 9, 2004 and in IEEE 802.1ad/D6.0 dated Aug. 17, 2005. A Spanning Tree Protocol (STP) is used to create loop-free virtual topology(s). Variants of spanning tree protocols include, for example, Multiple Spanning Tree (MSTP), Rapid Spanning Tree (RSTP), or the IEEE Shortest Path Bridging (SPB) protocol. As used herein, STP refers in general to any spanning tree protocol realization. Once STP has been run for an Ethernet bridge, some ports of the bridge are deactivated and only those ports that form the selected loop-free tree are activated. Multiple STP topologies can be used in parallel by disjunctive VLAN sets. Note that loop-free topologies can be created without using STP, buy configuring, for example, VLANs in a way such that loops cannot be formed, while all bridge ports can be in enabled forwarding state.

The Ethernet frame header includes a destination address (DA) field, a source address (SA) field, and a VLAN Identification (VID) field. When a frame is received by a bridge, it executes MAC learning by binding the incoming port to the SA (and optionally the VID) of the received frame and storing this information in a filtering database that maintains Forwarding Information (FI). Then, the bridge determines whether it has an FI entry associated with the DA of the received frame. If yes, the bridge forwards the frame over the specified port only. If there is no associated entry yet, the bridge broadcasts the frame over all of its enabled ports (constrained also by the VID) except the incoming port where the frame was received. From this operation, it follows that bridges only learn the port binding of a specific address if the bridge has already received a frame from that address. This is called backward address learning. There is also an aging timer that clears learned addresses. If no frame is received from an address for a predefined time period, the FI entry is removed.

There are problems trying to apply such address learning in transport networks. In transport networks, efficient and manageable path and capacity provisioning is needed for network operators and service providers. To fulfill operators' requirements, traditional transport technologies such as Asynchronous Transfer Mode (ATM), Synchronous Digital Hierarchy (SDH), and Multi-Protocol Label Switching (MPLS), rely on a connection-oriented feature set. That is, a connection is established between service endpoints in advance of data communication. This connection establishment must be performed on demand using a management system and/or an appropriate protocol.

It is desirable to reduce the cost of transport network equipment as well as operational expenses, and Ethernet technology is viewed as a cost efficient solution for next generation transport networks. However, Ethernet is inherently connection-less, therefore traditional path provisioning techniques cannot be applied.

To extend Ethernet with connection oriented features, standardization activities have been started in IETF to specify a Generalized MPLS (GMPLS) controlled Ethernet Label Switching (GELS) architecture. Details of such activities may be reviewed in IETF drafts, D. Papadimitriou, et al., "A Framework for GMPLS-controlled Ethernet Label Switching," February 2006; Don Fedyk, et al., "GMPLS control of Ethernet IVL Switches," December 2005; N. Sprecher, et al., "GMPLS Control of Ethernet VLAN Cross Connect Switches," April 2006; and Daegun Kim, et al., "Label Switched Ethernet (LSE) Architecture," December 2005. The proposed work is also presented in ITU and IEEE. These drafts propose utilizing the Resource Reservation Protocol-Traffic Extension (RSVP-TE) and Label Distribution Protocol (LDP) protocols to set up point-to-point (p2p) Ethernet connections. However, the use of these protocols requires adding complex protocol stacks to Ethernet bridges.

It would be desirable to have an improved method and system for extending Ethernet with path provisioning features for use in transport networks. The present invention provides such a method and system utilizing forced MAC learning.

SUMMARY OF THE INVENTION

In one aspect, the present invention applies a constrained-based source-routing concept to bridged Ethernet networks. The invention provides a simpler and less costly solution to extending Ethernet with connection oriented features. The invention utilizes Ethernet MAC learning functionality in a new application while introducing only a lightweight protocol stack for path provisioning in Ethernet networks. This enables the cost-effective deployment of bridged Ethernet networks in Metro and Core networks. In such environments, the basic building blocks designed with Ethernet's LAN application in mind (such as STP) are enhanced.

In another aspect, the invention is directed to a method of setting up a path from a first node, through an intermediate bridge node having a plurality of input/output ports for data communication, to a second node in a communications network. The method includes the steps of constructing a list of links in the path, each link including a destination address, source address, port number, and VID; and sending a path learning frame containing the list to each node in the path. The path learning frame is sent in reverse order from the second node to the intermediate bridge node and from the intermediate bridge node to the first node. Upon receiving the frame in the intermediate bridge node, the node saves the frame's header information as learned path information, removes the node's own information from the list, and forwards the frame with the remainder of the list to the next node using the port specified by the port number for that link. When the path learning frame arrives at the first node, all nodes have saved the learned path information.

In another aspect, the invention is directed to an Ethernet bridge for setting up a path from a first node to a second node in a communications network. The bridge includes a plurality of input/output ports for data communication. A first port receives from the second node, a first path learning frame which includes path learning information defining a hop of the path from the bridge to the first node. The bridge includes means for extracting a source address of the second node and a VID from a header of the path learning frame; and a database of learned path information for storing the source address as a destination address for a return frame, the VID, and an identification of the first port. The bridge also includes means for constructing a second path learning frame which includes path learning information defining a hop of the path from the first node to a further node on the path, if one exists, and if a further node does not exist, having no path learning information. The bridge also includes means for sending the second path learning frame to the first node through a port specified in the path learning information received in the first path learning frame.

In another aspect, the invention is directed to a system for setting up a path from a first node to a second node in a communications network. The path passes through at least one intermediate bridge node having a plurality of input/output ports for data communication. The system includes a path construction unit for constructing a list of links in the path, each link including a destination address, source address, port number, and VID and for sending a first frame containing the list to the second node. The second node includes means for receiving the frame containing the list, saving the frame's header information as learned path information, removing the second node's own information from the list, and sending a path learning frame containing the remainder of the list to a first intermediate bridge node, wherein the path learning frame is sent using the port specified by the port number for that link. Each of the at least one intermediate bridge nodes includes means for receiving the path learning frame from the second node or a subsequent path learning frame from a previous intermediate bridge node containing the list, saving the received frame's header information as learned path information, removing the intermediate bridge node's own information from the list, and sending a subsequent frame containing the remainder of the list to the next intermediate bridge node, wherein the subsequent frame is sent using the port specified by the port number for that link. When the frame arrives at the first node, all nodes have saved the learned path information.

DETAILED DESCRIPTION OF EMBODIMENTS

The IETF Generalized MPLS (GMPLS) controlled Ethernet Label Switching (GELS) architecture proposes the setup of controlled point-to-point (p2p) and point-to-multipoint (p2mp) paths. Currently, the LDP and/or RSVP-TE signaling protocols of the GMPLS control plane are proposed for path setup signaling. However, this implies adding complex protocol stacks to simple Ethernet bridges. This additional overhead decreases the cost-per-port benefit of Ethernet equipment.

In order to maintain the cost advantage of Ethernet transport, an embodiment of the present invention utilizes a lightweight protocol and a slim protocol stack for path setup signaling. The invention makes use of the standard MAC learning functionality extended for use in transport networks.

Network edge nodes (or a centralized resource manager) maintain network topology information and, optionally, resource usage information. This information is dynamic, meaning that any change to the network topology or resources due, for example, to failures must be accounted for by the automatic resource manager(s).

Figure 1:
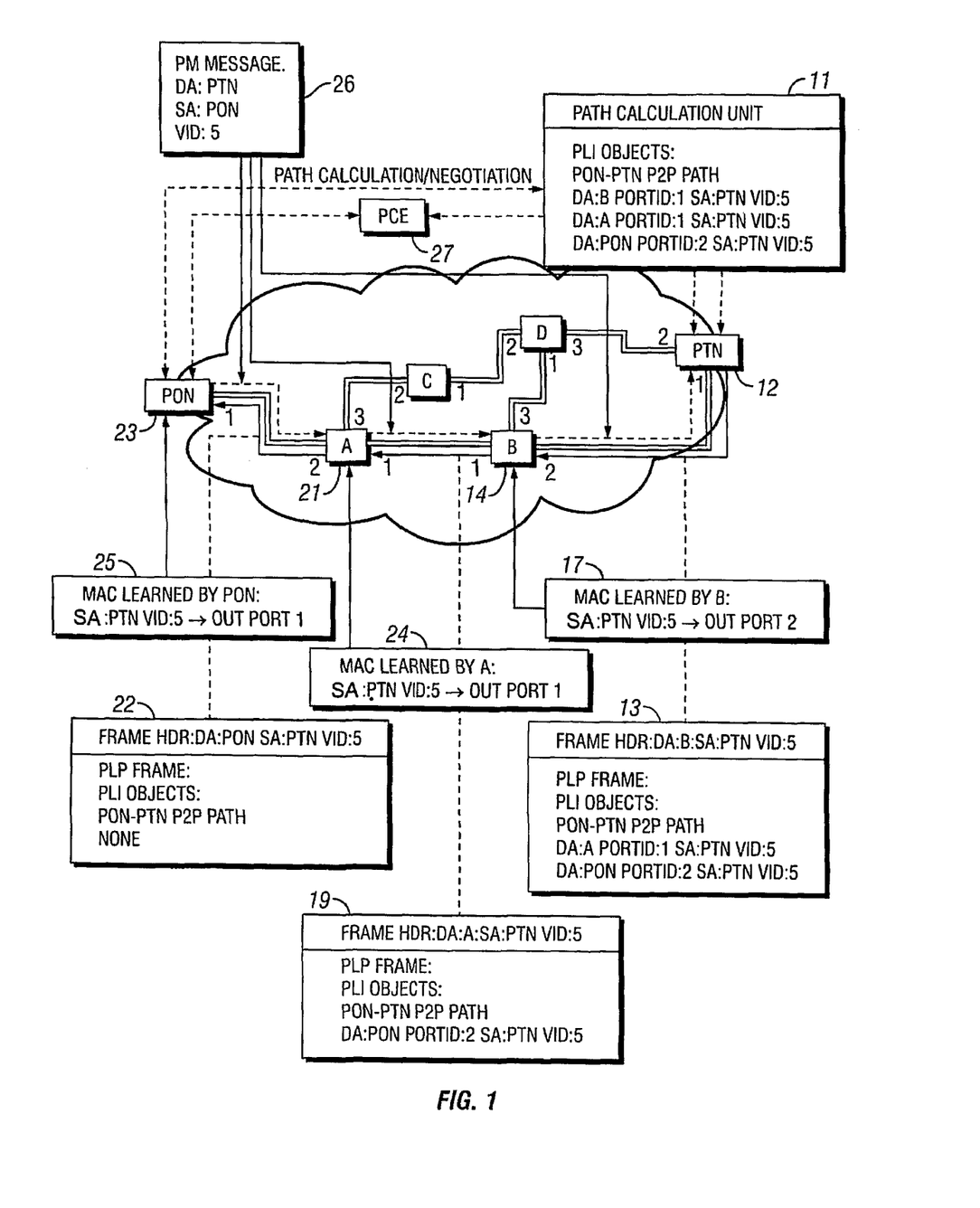
FIG. 1 is a simplified block diagram of a transport network modified in accordance with an embodiment of the system of the present invention.

FIG. 1 is a simplified block diagram of a transport network modified in accordance with an embodiment of the system of the present invention. When a path setup request arrives in the communication network from a Network Management System (NMS) or through an appropriate signaling protocol (for example, GMPLS or MPLS) from outside the network domain, a path setup process is initiated. A Path Calculation Unit 11 first constructs a list of linked bridges (referred to herein as a Previous Hop Bridge (PHB) list) which specifies the entire path (p2p or p2mp) to be configured. The Path Calculation Unit may be located, for example, in a network edge node configured with network topology information or in a centralized management node such as the PCE 27, so long as the entity constructing the list has knowledge of the network topology.

It should be noted that the specified path may not follow an STP-defined loop-free topology. Therefore, instead of STP, the invention may utilize VLANs to realize loop-free forwarding. For path calculations, the topology and resource information and/or path constraints received through the NMS or external signaling protocol are considered. Since MAC learning must be initiated in backward fashion, the path setup must also be started from the terminating endpoint in the p2p case and from all the terminating endpoints in the p2mp case. Thus, if needed, a signaling session may be established between path endpoints and/or a central path computation element.

Since MAC learning must be initiated from the far end of the path, next hops are in reverse order. The constructed PHB list contains in reverse order each hop, or link, of the path. Each object in the PHB list corresponds to forwarding information needed for one bridge in the network. The objects have the following fields: one port ID, one MAC SA, one MAC DA, and one VID. Optionally other fields may be included, such as path identifier (domain wide label), path endpoint addresses, multiple port identification, next hop identifier (local label), p2p and p2mp identification, additional VID for VLAN translation, and so on.

Figure 2:
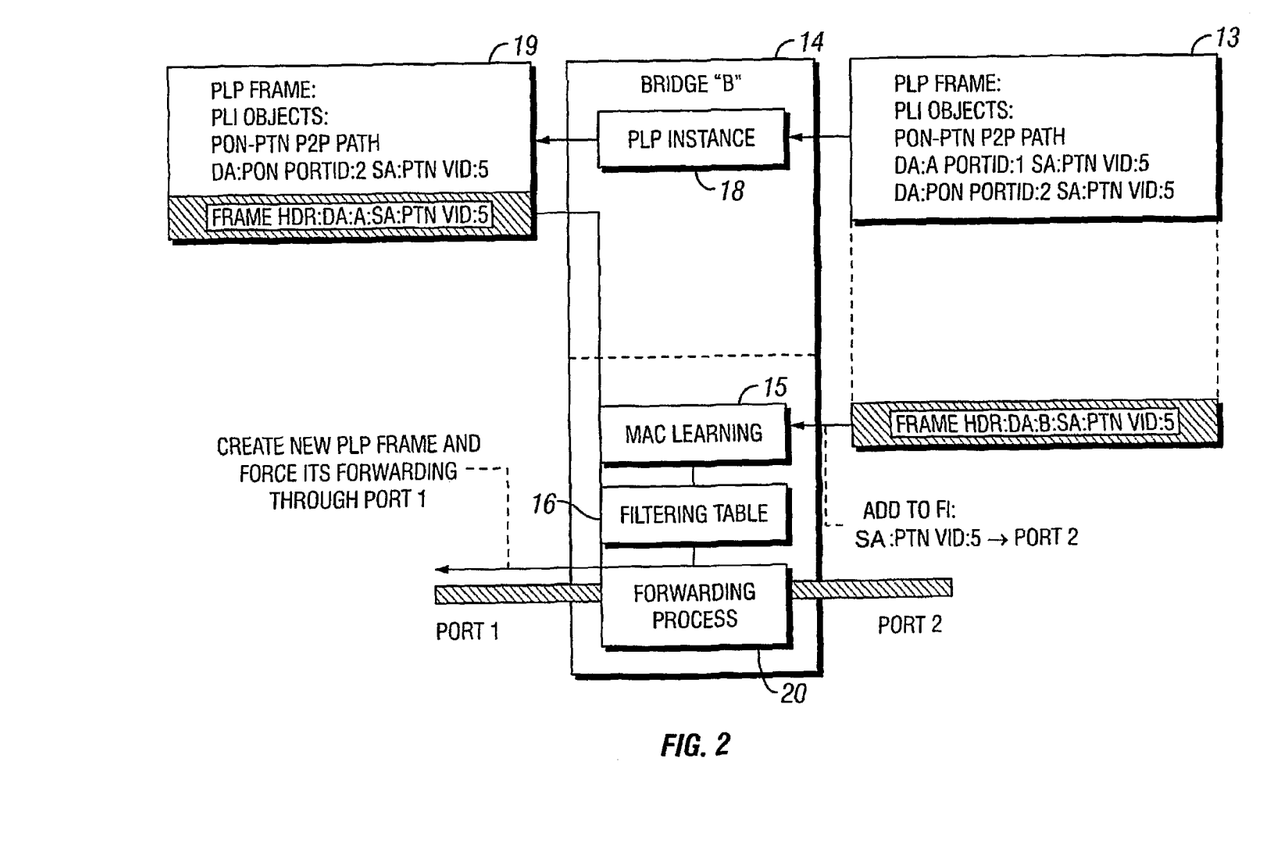
FIG. 2 is a simplified block diagram of an Ethernet bridge utilized in the embodiment of FIG. 1.

FIG. 2 is a simplified block diagram of an Ethernet bridge utilized in the embodiment of FIG. 1. With reference to FIGS. 1 and 2, an embodiment of the method of the present invention will be described. In the p2p case, the Path Terminator Node (PTN) 12 picks the first element of the PHB list, and the Path Learning Protocol (PLP) instance at the PTN constructs a PLP signaling frame 13 with its own PTN MAC SA (or if different, the end node address of the path to be configured) and the MAC DA of the previous hop bridge (Bridge-B) deduced from the PHB list. In order to restrict the forwarding of the newly created frame at the previous hop bridge (Bridge-B) all bridges should have their own MAC address configured in the local filtering table not to be forwarded. As an alternative to using the bridge MAC address, a special group MAC address (the Group Bridge Address) can be used as the packet MAC DA that is always filtered by all bridges. Additionally, the VID of the frame is set in accordance with the VID specified in the PHB list for the selected previous hop bridge (in this example VID:5). The so-created frame is filled with p2p Path Learning Information (PLI). The PLI includes the remaining PHB list, which is the result of omitting the information for the bridge that created the frame (in this case the PTN). The PTN then sends this frame through the port specified by the port ID in the selected PHB object (in this example, Port 1).

With further reference to FIG. 2, the targeted previous hop bridge, Bridge-B 14, receives the PLP frame, and the Ethernet MAC learning mechanism 15 adds the SA of the frame (the address of the PTN) and the local port from which it received the frame (Port 2) to the local Forwarding Information (FI) in the filtering table 16. Thus the MAC learned information 17 for Bridge-B is SA:PTN, VID:5, and output port:2.

Bridge-B hands the frame up to processing. An appropriate mechanism identifies the frame as a PLP frame and calls the local PLP instance 18. The PLP instance repeats the same steps as the PLP at the PTN and creates a new PLP frame 19 with the remaining PLI. A forwarding process 20 forwards the new PLP frame to the specified next previous hop bridge (in this example, Bridge-A 21) through the specified port (Port 1). Bridge-A repeats these steps and sends another PLP frame 22 to the Path Originating Node (PON) 23. The MAC learned information 24 for Bridge-A is SA:PTN, VID:5, and output port:1. The PLP frame 22 includes a PLI containing no hop objects. This signals the PON that the path has been successfully established in the PON-PTN direction. The MAC learned information 25 for the PON is SA:PTN, VID:5, and output port:1.

It should be noted that the MAC learned information sets up a path in the PON-PTN direction. To set up a bidirectional path (and for Operations, Administration, and Management, OAM, purposes), the path in the PTN-PON direction is also set up using the same intermediate nodes. This may be accomplished, for example, by sending a Path Monitoring (PM) signaling message 26 from the PON 22 to the PTN 12, with DA=PTN, SA=PON, and VID=same as for the PON-PTN path. Since the PON-PTN path is already established, the PM message takes the constrained path. By passing through the nodes of the path (Bridge-A, Bridge-B, and PTN), the path's reverse direction is learned as the PTN-PON path. This learning is accomplished through standard Ethernet bridging, without the need for further processing. In this manner, a bidirectional path is established. Both directions can be used for data forwarding.

To maintain the path, the PTN 12 and PON 23 may exchange PM messages periodically. The PM messages may be used to check connectivity and path integrity. Moreover, additional signaling information may also be carried in PM frames. Note that instead of defining a new PM message format and processing functions, one embodiment of the present invention may utilize the Connectivity Fault Management (CFM—IEEE standard 802.1ag) architecture and protocol for path monitoring and maintenance as well.

Once the path is established, if needed, the PON 23 and/or PTN 12 may notify additional nodes (external or internal to the domain) using appropriate protocols such as GMPLS.

In the case of a network failure (i.e., a node or link problem), the established path may become unavailable. The PM monitoring messages notify the PON of a possible connectivity problem. Until the Path Computation Element (PCE) 27 recalculates and reestablishes a new path, the forwarding of data traffic may be suspended or a backup loop-free topology (for example, configured VLANs or STP instance) may be utilized. Alternatively, the described path provisioning process may be used to set up multiple PON-PTN paths in advance. One of the paths may be used as the active path while the other(s) are used as backup paths. If the active path fails, the traffic is switched to a protection (backup) path which is still intact. In order to distinguish different PON-PTN paths, different VIDs may be associated with each path, or different virtual MAC addresses can be used. That is, the operator-defined MAC address space is used in the network, and the operator configures multiple MAC addresses for PTNs and/or PTN ports.

Figure 3:
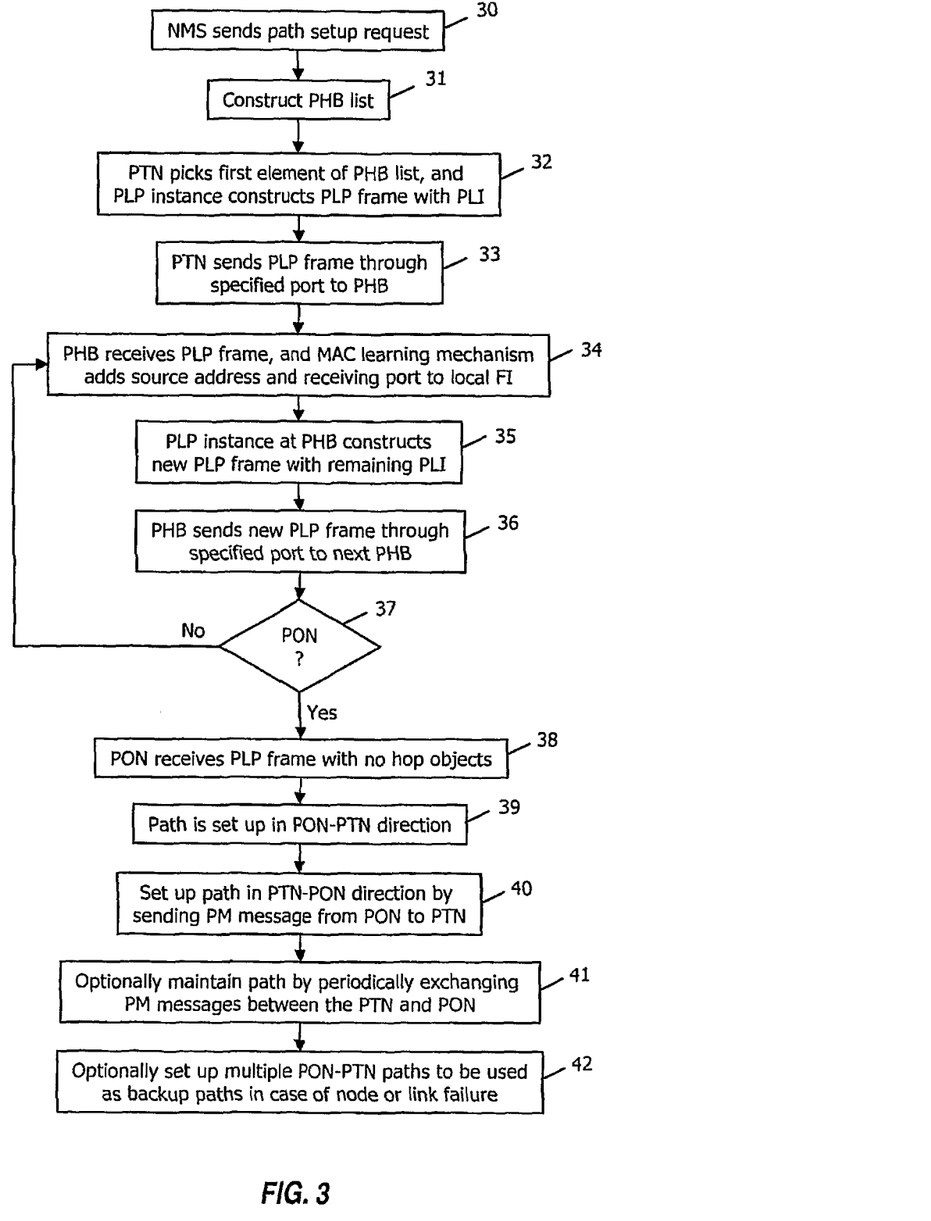
FIG. 3 is a flow chart illustrating the steps of an embodiment of the method of the present invention.

FIG. 3 is a flow chart illustrating the steps of an embodiment of the method of the present invention covering the point-to-point (p2p) case. At step 30, an NMS sends a path setup request through an appropriate signaling protocol (for example, GMPLS or MPLS) from outside the network domain, and includes any path constraints. At step 31 the Path Calculation Unit 11 constructs a list of linked previous hop bridges (PHB list). The PHB list specifies the entire p2p path to be configured, with each hop of the path in reverse order. Each object in the PHB list provides the FI needed for one bridge in the network. At step 32, the PTN 12 picks the first element of the PHB list, and the PTN's PLP instance constructs the PLP frame 13, which includes PLI. The PLI includes the PHB list with the PTN bridge information removed. At step 33, the PTN sends the PLP frame through the specified port to the previous hop bridge, Bridge-B 14.

At step 34, the previous hop bridge, Bridge-B 14, receives the PLP frame 13, and the Ethernet MAC learning mechanism 15 adds the SA (the address of the PTN) and the local port from which it received the frame (Port 2) to the local FI in the filtering database 16. At step 35, the PLP instance in Bridge-B repeats the same steps as the PLP at the PTN and constructs a new PLP frame 19 with the remaining PLI (omitting the Bridge-B information). At step 36, Bridge-B forwards the new PLP frame to the specified next previous hop bridge (in this example, Bridge-A 21). At step 37, it is determined whether or not the receiving bridge is the PON 23. If not, the process loops and repeats steps 34-36 until all bridges in the p2p path have learned the path information. In this example, since Bridge-A is not the PON, Bridge-A repeats these steps and sends another PLP frame 22 to the PON 23.

At step 38, the PON receives the PLP frame 22. At step 39, the PON determines that the path has been successfully established in the PON-PTN direction because the PLP frame 22 includes a PLI containing no hop objects. At step 40, a bidirectional path is set up in the PTN-PON direction by sending the PM signaling message 26 from the PON 23 to the PTN 12. At step 41, the PTN and PON optionally exchange PM messages periodically in order to maintain the p2p path. At step 42, the path provisioning process may optionally be used to set up multiple PON-PTN paths in case the established path becomes unavailable due to a link or node failure.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. An Ethernet bridge for setting up a point-to-point path comprising a plurality of hops from a Path Originating Node (PON) to a Path Terminating Node (PTN) in a communications network, said bridge having a plurality of input/output ports for data communication and being an intermediate bridge between the PON and the PTN, said Ethernet bridge comprising:
   a first port for receiving from the PTN, a first path learning frame constructed by the PTN by running a path computation algorithm on network topology information received from a network management system or Path Computation Element (PCE), wherein the first path learning frame includes path learning information defining the complete path from the PON to the PTN, wherein a plurality of elements define hops of the path in reverse order from the PTN to the PON, with forwarding information for the PTN removed;
   wherein the Ethernet bridge is configured to:
      add to a database in the Ethernet bridge, learned path information defining the received frame hop;

construct a second path learning frame which includes path learning information, wherein to construct the second path learning frame, the Ethernet bridge is configured to:
  remove forwarding information for the Ethernet bridge from the elements of the received path learning frame; and
  utilize the remaining elements as the path learning information for the second path learning frame;
if a next Previous Hop Bridge (PHB) in the path is not the PON, the Ethernet bridge is configured to send the second path learning frame to the next PHB through a port specified in the forwarding information, wherein the next PHB adds the learned path information for the received frame hop and constructs a next path learning frame with the forwarding information for the next PHB removed; and
if the next PHB in the path is the PON, the Ethernet bridge is configured to send the second path learning frame to the PON through a port specified in the forwarding information, wherein the path learning information has no elements remaining, wherein the PON is configured to add to a database in the PON, learned path information defining the received frame hop, thereby completing setup of the path from the PON to the PTN.

2. A method of setting up a point-to-point path comprising a plurality of hops from a Path Originating Node (PON) to a Path Terminating Node (PTN) in a communications network having a plurality of Ethernet bridges, each of said bridges having a plurality of input/output ports for data communication, said method comprising:
  constructing a Previous Hop Bridge (PHB) list comprising a plurality of elements, wherein each element contains forwarding information defining an associated hop of the path, said elements being listed in reverse order from the PTN to the PON, wherein the PHB list is constructed by reversing a path list obtained by running a path computation algorithm on network topology information received from a network management system or Path Computation Element (PCE);
  constructing by the PTN, a first path learning frame which includes path learning information for the complete path from the PON to the PTN, said step of constructing a first path learning frame including:
    removing the forwarding information for the PTN; and
    utilizing the remaining PHB list as the path learning information;
  sending the first path learning frame from the PTN to a first PHB through a port specified in the forwarding information;
  adding to a database in the first PHB, learned path information defining the received frame hop;
  constructing by the first PHB, a second path learning frame which includes path learning information, said step of constructing a second path learning frame including:
    removing the forwarding information for the first PHB; and
    utilizing the remaining PHB list as the path learning information;
  if the next PHB in the path is not the PON:
    sending the second path learning frame from the first PHB to the next PHB through a port specified in the forwarding information: and
    repeating the steps of adding the learned path information for the received frame hop and constructing a next path learning frame with the forwarding information for the next PHB removed;
  if the next PHB in the path is the PON:
    sending the second path learning frame from the first PHB to the PON through a port specified in the forwarding information, wherein the path learning information has no elements remaining; and
    adding to a database in the PON, learned path information defining the received frame hop; wherein the path is set up from the PON to the PTN.

3. The method according to claim 2, wherein the step of constructing a PHB list includes constructing a list of elements in which the forwarding information in each element includes a destination address, a source address, a port identification, and a Virtual Local Area Network (VLAN) Identification for the associated hop.

4. The method according to claim 3, wherein the step of adding to a database, learned path information defining the received frame hop includes adding to the database, the source address of the received frame and the port through which the frame was received.

5. A system for setting up a point-to-point path comprising a plurality of hops from a Path Originating Node (PON) to a Path Terminating Node (PTN) in a communications network having a plurality of Ethernet bridges, each of said bridges having a plurality of input/output ports for data communication, said system comprising:
  a path construction unit in the PTN configured to:
    construct a Previous Hop Bridge (PHB) list comprising a plurality of elements, wherein each element contains forwarding information defining an associated hop of the path, said elements being listed in reverse order from the PTN to the PON, wherein the PHB list is constructed by reversing a path list obtained by running a path computation algorithm on network topology information received from a network management system or Path Computation Element (PCE); and
    construct a first path learning frame which includes path learning information for the complete path from the PON to the PTN, wherein the first path learning frame is constructed by removing the forwarding information for the PTN and utilizing the remaining PHB list as the path learning information;
  an outputting unit in the PTN configured to send the first path learning frame from the PTN to a first PHB through a port specified in the forwarding information;
  a database in the first PHB for storing learned path information defining the received frame hop;
  a frame constructing unit in the first PHB configured to construct a second path learning frame which includes path learning information, wherein to construct the second path learning frame, the frame constructing unit is configured to:
    remove the forwarding information for the first PHB; and
    utilize the remaining PHB list as the path learning information;
  if the next PHB in the path is not the PON:
    a forwarding unit in the first PHB is configured to send the second path learning frame to the next PHB through a port specified in the forwarding information; and
    the next PHB is configured to add the learned path information for the received frame hop and to construct a next path learning frame with the forwarding information for the next PHB removed; and if the next PHB in the path is the PON:
   the forwarding unit in the first PHB is configured to send the second path learning frame to the PON through a port specified in the forwarding information, wherein the path learning information has no elements remaining; and
   the PON is configured to add to a database in the PON, learned path information defining the received frame hop, thereby completing setup of the path from the PON to the PTN.

* * * * *

UNITED STATES PATENT AND TRADEMARK OFFICE
CERTIFICATE OF CORRECTION

PATENT NO. : 8,687,519 B2  
APPLICATION NO. : 12/305810  
DATED : April 1, 2014  
INVENTOR(S) : Takacs Page 1 of 1

It is certified that error appears in the above-identified patent and that said Letters Patent is hereby corrected as shown below:

In the Specification

In Column 5, Line 25, delete "PON 22" and insert -- PON 23 --, therefor.

In the Claims

In Column 7, Line 65, in Claim 2, delete "information: and" and insert -- information; and --, therefor.

Signed and Sealed this
Fifteenth Day of July, 2014

Michelle K. Lee
*Deputy Director of the United States Patent and Trademark Office*